April 4, 1950 A. J. WILLIAMS, JR 2,503,085
MEASURING SYSTEM
Filed March 29, 1945 7 Sheets-Sheet 1

INVENTOR.
ALBERT J. WILLIAMS, JR
BY
Virgil E. Woodcock
ATTORNEY

INVENTOR.
ALBERT J. WILLIAMS, JR.
BY
Virgil E. Woodcock
ATTORNEY

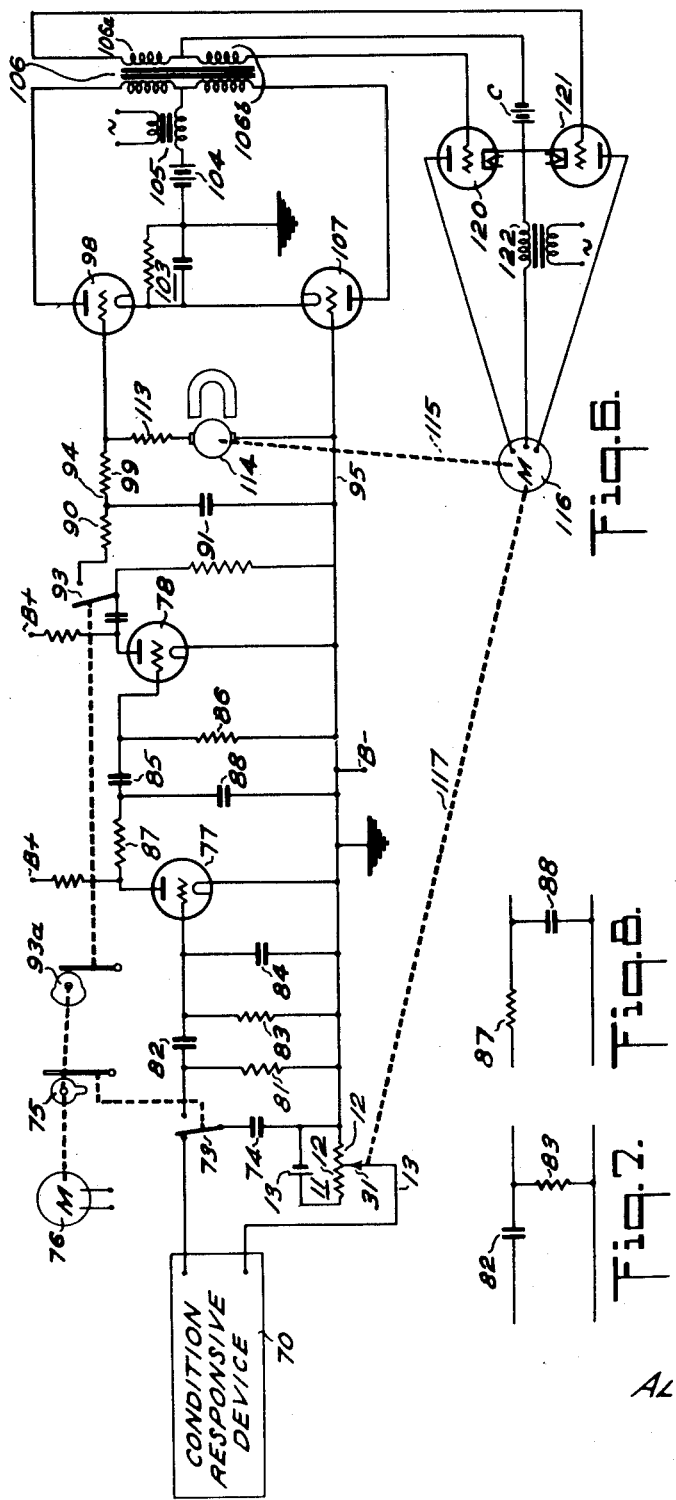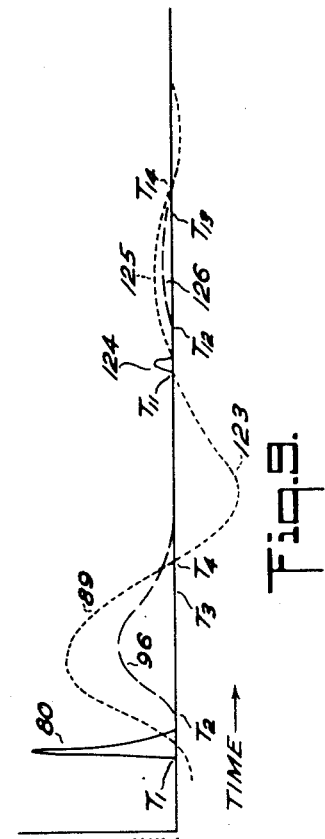

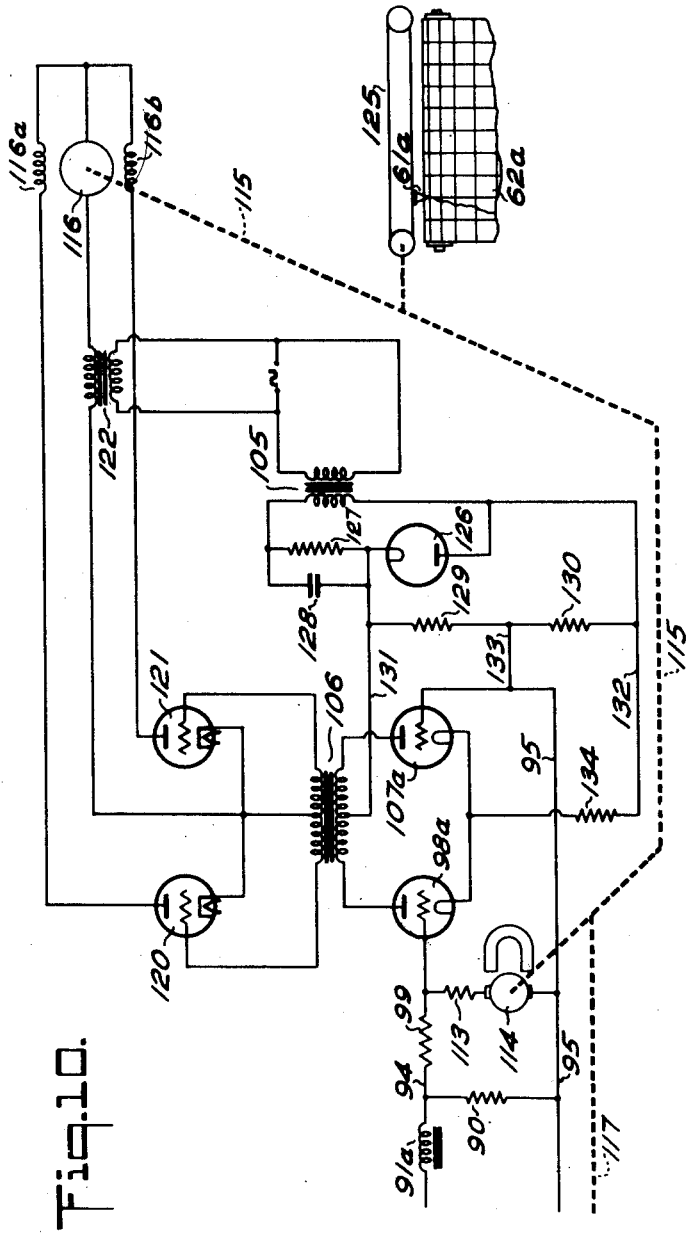

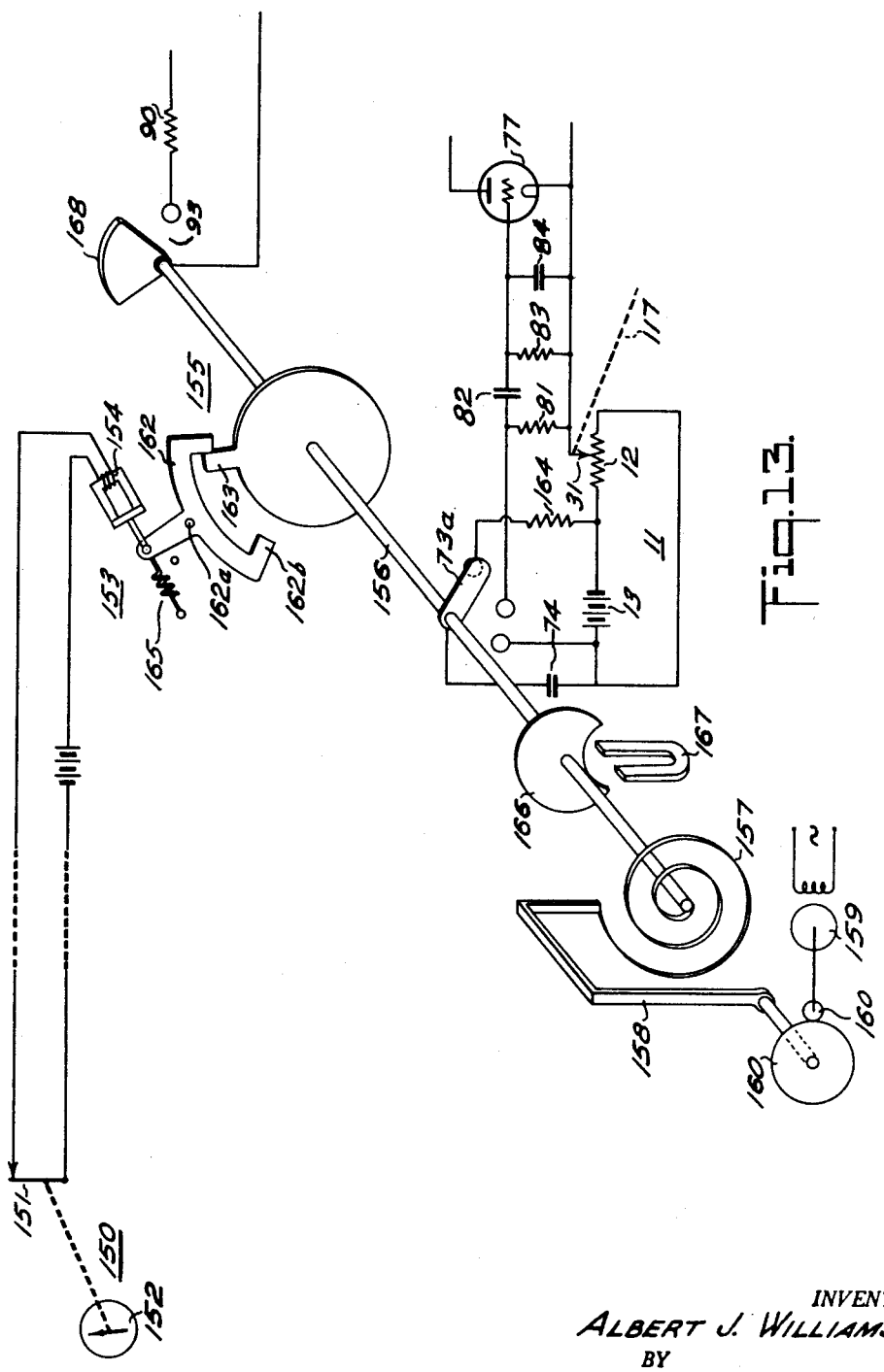

Patented Apr. 4, 1950

2,503,085

UNITED STATES PATENT OFFICE 2,503,085

MEASURING SYSTEM

Albert J. Williams, Jr., Philadelphia, Pa., assignor to Leeds and Northrup Company, Philadelphia, Pa., a corporation of Pennsylvania Application March 29, 1945, Serial No. 585,511

11 Claims. (Cl. 318—28)

This invention relates to self-balancing measuring systems of the type in which the magnitude of a condition is determined by the position of a circuit-balancing device and has for an object the provision of a measuring system characterized by its high speed of operation, its accuracy, and its freedom from the influence of external factors.

For comparative purposes, reference will be made to two types of measuring systems now well known to those skilled in the art. The first includes a galvanometer which controls the operation of a mechanical relay for positioning a slidewire to produce balance of a measuring circuit as determined by the position of the galvanometer. The galvanometer-relay combination requires a plurality of steps to effect balance of the circuit and to move an indicator or recorder across a scale or chart. The operation, though highly satisfactory for many applications, is inherently slow because the impact forces incident to the engagement of a driving cam with a clutch-driving member limits the permissible speed of operation, i. e., the number of steps per minute.

The second type of measuring system consists of a vibrator or chopper which converts an unbalanced unidirectional current into an alternating current which is amplified, rectified, and applied to a motor which directly drives the rebalancing slidewire. Systems of this type operate at high speed but they are not applicable to systems where an integration is involved in the measurement of a magnitude of a condition. For example, in telemetering, the magnitude of a condition is frequently transmitted in terms of the duration of a signal. Since the duration alone is of significance, a continuously operating measuring system does not lend itself to intermittent operation.

In the measurement of extremely minute currents, it is necessary for them to flow into a capacitor for an appreciable time in order to build up a voltage of a magnitude sufficient for measurement. Measurements of X-ray radiation are typical because the magnitude of the current from an ionization chamber is too low for direct measurement. From a theoretical standpoint, direct current amplifiers might be utilized, but in general, they have not been commercially satisfactory for applications of this character.

In measuring or determining the strength of a magnetic field, a small coil may be mounted in the field and rotated through 180°. The instantaneous voltage generated thereby is not of great importance. However, the strength of the field may be determined in terms of the time integral of the induced voltage, i. e., in terms of volt-seconds. The measuring systems herein disclosed are well suited for such an application.

In accordance with the present invention, the desirable features of the prior art measuring systems referred to above have been retained with few, if any, of their limitations. The measuring systems characterizing the present invention are applicable to those fields in which the prior art measuring systems have been satisfactory and to many fields where the prior art systems have not been applicable or where they have been unsatisfactorily applied.

In carrying out the present invention in one form thereof, an impulse proportional to the unbalance of a measuring circuit is transformed into a control signal whose amplitude changes at a rate no greater than the maximum rate at which the circuit-balancing means may be driven. This circuit-balancing means is then driven at a rate which is at all times proportional to the instantaneous magnitude of the signal and through a distance which is proportional to the time integral of the impulse. The impulses may be produced at any desired rate, as for example, from one per second to ten or more per second. Each impulse is transformed into a control signal, either mechanical or electrical, whose time integral is proportional to the time integral of that of the impulse, but whose instantaneous magnitudes change at a rate which can be closely followed by a circuit-adjusting means. Accordingly, after the application of an impulse, the measuring circuit may be rebalanced in a single continuous operation, a single step of the mechanism.

For further objects and advantages of the invention and for a more detailed description thereof, reference should now be had to the following description taken in conjunction with the accompanying drawings, in which:

Fig. 1 diagrammatically illustrates one preferred form of the invention;

Figure 14:
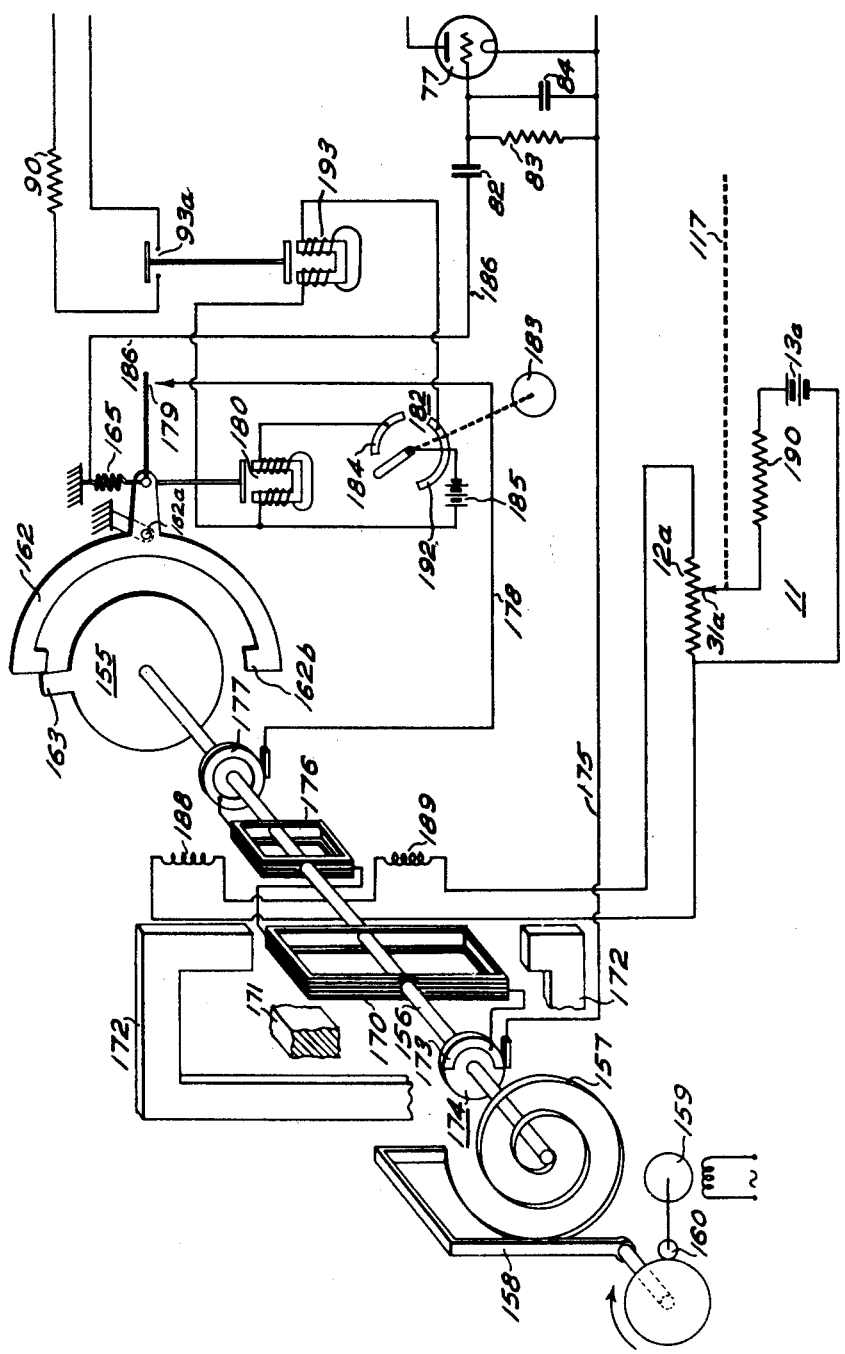
Figure 15:
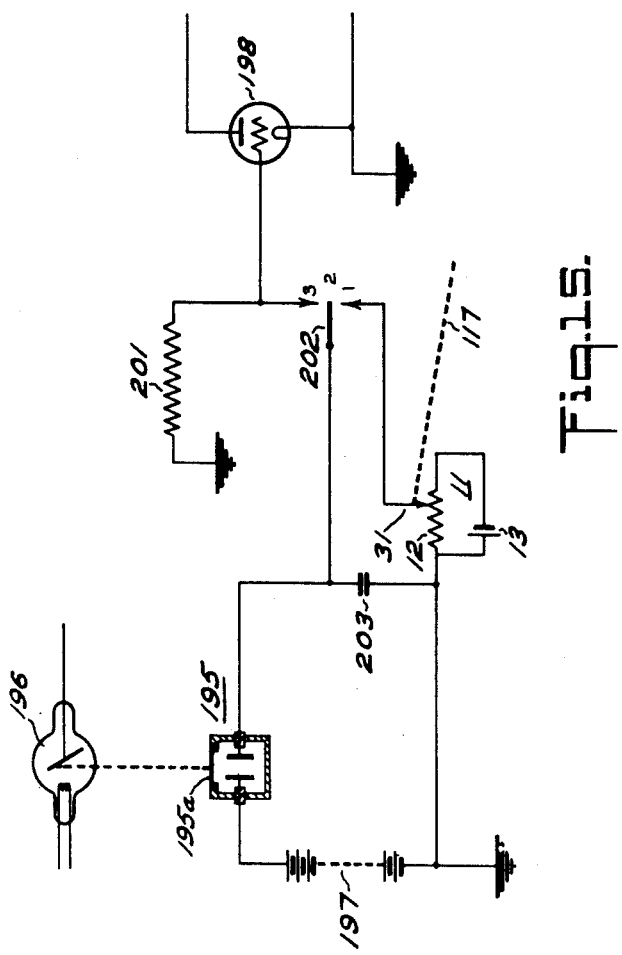

Fig. 6 diagrammatically illustrates another preferred form of the invention;

Figs. 7 and 8 are illustrative fractional diagrams of certain circuits found in the amplifier of Fig. 6;

Fig. 9 illustrates curves explanatory of the operation of the system of Fig. 6;

Fig. 10 illustrates a further modification of the system of Fig. 6;

Figs. 11 and 12 illustrate curves expanatory of the operation of the system of Fig. 10; and Figs. 13–15 diagrammatically illustrate still further applications of the system of Fig. 6.

Figure 1:
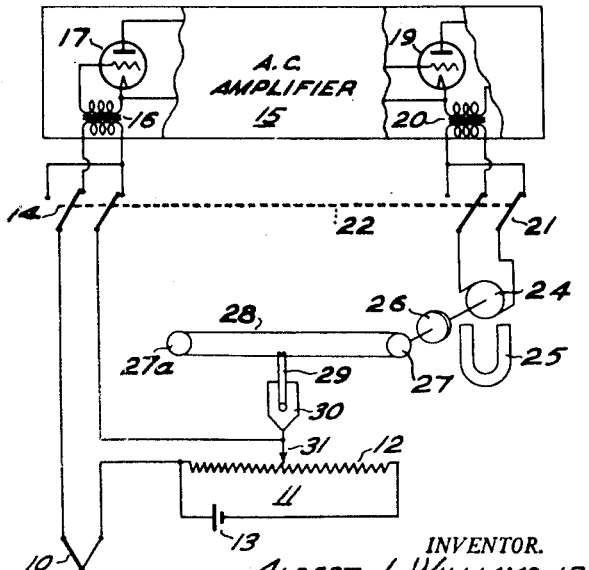

Referring to the drawings, the invention has been shown in one form as aplied to the measurement of the magnitude of a condition, such as pressure, ion concentration, pH values, X-ray radiation, or other chemical, physical or electrical conditions, such for example, as temperature. Accordingly, in Fig. 1 a thermocouple 10 has been shown as connected in a measuring circuit which includes a potentiometer 11 comprising a resistor 12 and a battery 13. The circuit also includes a reversing switch 14 and the input circuit of an alternating current amplifier 15. This input circuit comprises a coupling transformer 16 and an electric valve 17. The amplifier 15 may be of more or less conventional design. A part of the output circuit is shown as including an electric valve 19 and an output transformer 20. The secondary winding of the transformer 20 is connected through a reversing switch 21, mechanically operated in timed relation with the reversing switch 14 as indicated by the broken line 22, to a ballistic motor 24 having a permanent magnet 25 providing excitation therefor. The motor 24 is preferably provided with a flywheel 26 on the same shaft which drives a pulley 27 for positioning, by means of a violin-string or belt 28, a control arm 29 of a circuit-adjusting mechanism 30. The belt or cord 28 is supported at its opposite end by a second pulley 27a.

The mechanism 30 serves relatively to adjust the position of the resistor or slidewire 12 with reference to its associated contact 31.

The reversing switches 14 and 21 are operated simultaneously to reverse the input circuit including thermocouple 10, and the output circuit including motor 24. The rate of reversal of these circuits may be as high as 10 per second, a rate considerably less than any commercial alternating current, but materially above the periodicity of earlier forms of intermittently operable measuring systems.

In operation, when the potential of the thermocouple 10 is equal to that derived from the potentiometer 11, no potential difference is applied by way of the reversing switch 14 to the input circuit of the amplifier 15. However, when the thermocouple voltage changes, a pulse is applied by the reversing switch 14 to the input circuit of the amplifier, the polarity of which depends upon the direction of change of the thermocouple voltage and the position of the reversing switch 14. The amplified impulse, larger than, but whose time integral is proportional to the time integral of the original impulse, is applied by way of the output circuit and the reversing switch 21 to the motor 24. So long as the polarity of the impulse at the input side of the reversing switch 14 does not change, the polarity of the impulses applied to the motor 24 does not change. However, the periodic reversal of the applied voltage, by means of the operation of the reversing switch 14, applies to the amplifier 15 impulses of alternating polarities. In consequence, the amplifier 15 is designed for alternating current operaton and the design and operating limitations of direct current amplifiers are thereby avoided. Additionally, alternating current at commercial frequencies, which is often a source of bothersome spurious signals, may be readily eliminated by suitably tuned circuits provided in the amplifier. The reversing switch 21, operating in synchronism with the switch 14, serves as a mechanical rectifier of these impulses so that the impulses applied to the motor 24 are of proper polarity.

The motor 24 is characterized by its low friction and its high inertia whereby it partakes of the characteristics of a ballistic galvanometer. Where the motor itself does not possess the required inertia, a flywheel 26, of more or less conventional form, may be utilized. In other words, the motor 24 provides in the circuit a means for transforming the applied impulses into mechanical movements of extents proportional to the time integrals of the impulses. It will, therefore, be seen that the motor 24 has a response which is proportional to the time integrals of the impulses applied to the amplifier 15. It is unimportant what the character of the impulses may be; i. e., whether the impulses be of high magnitude and short duration or of lower magnitude and longer duration. In either case, the motor 24 transforms the applied impulses into a mechanical control signal whose amplitude varies at a finite rate, as determined by the inertia of the motor system.

The adjusting mechanism 30 has the characteristic of effecting adjustment of the potentiometer 11 at a speed which is dependent upon the extent of displacement of the control arm 29 from its neutral position and produces movement of the contact 31 through distances which are proportional to the time integrals of the applied impulses. The potentiometer is adjusted at a rate which follows the instantaneous magnitudes of said control signal.

The described adjustment of the potentiometer 11 is in marked contrast with prior systems because of the production of a control signal having such a rate of change that it may at all times be closely followed by a like rate of change of the adjusting means 11.

Figure 2:
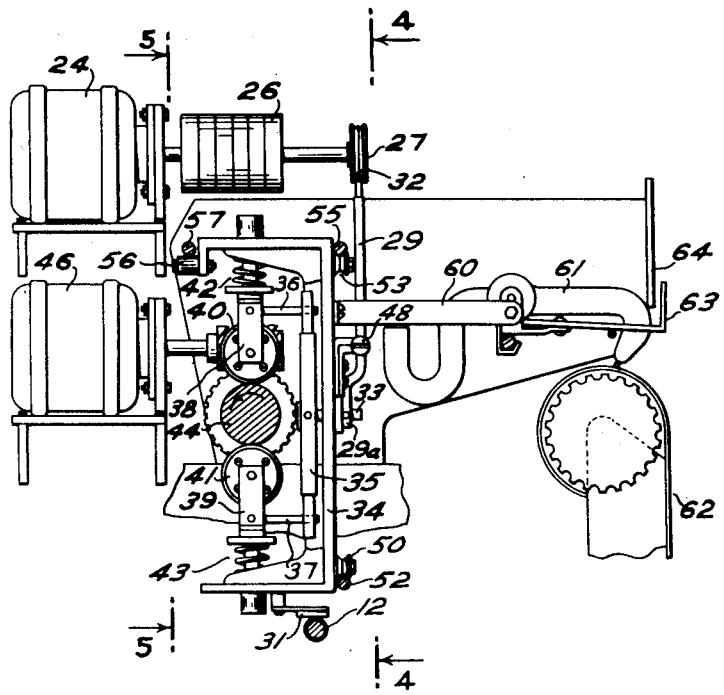
Fig. 2 is a side elevation, partly in section, of one form of the invention.
Figure 3:
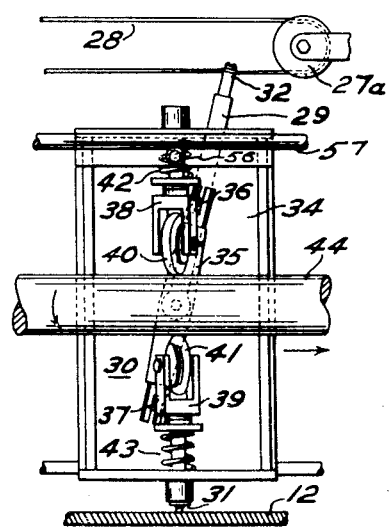
Fig. 3 is a fractional rear view, like Fig. 5, but with the driving elements in active positions.
Figure 4:
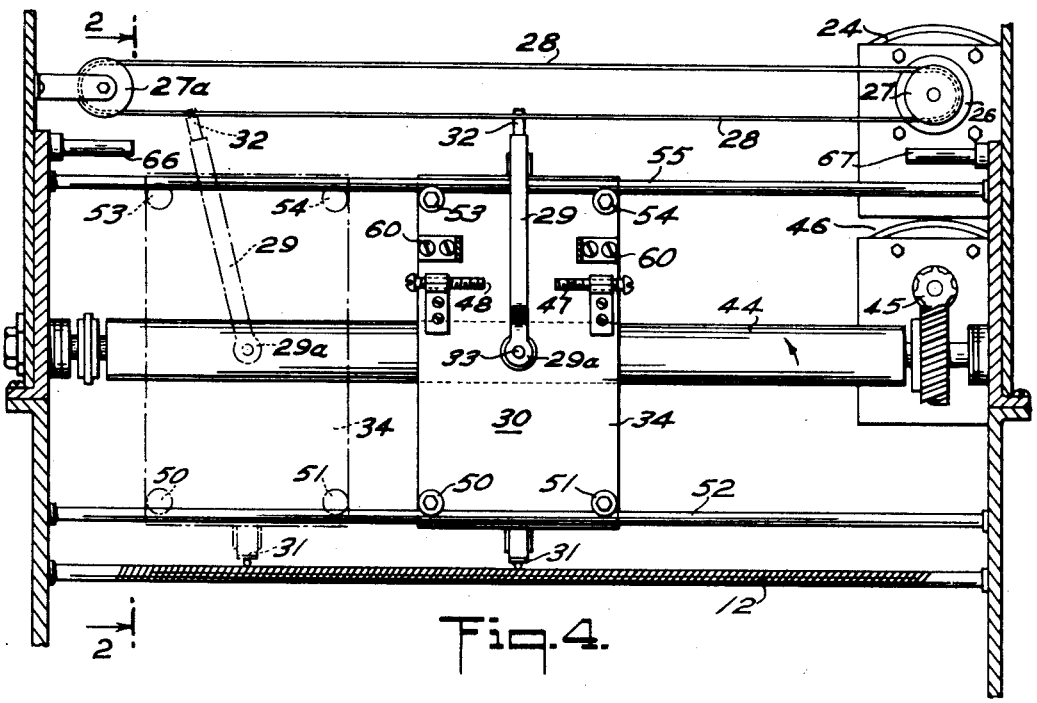
Fig. 4 is a front view, partly in section, along the line 4—4 of Fig. 2, with certain parts omitted.
Figure 5:
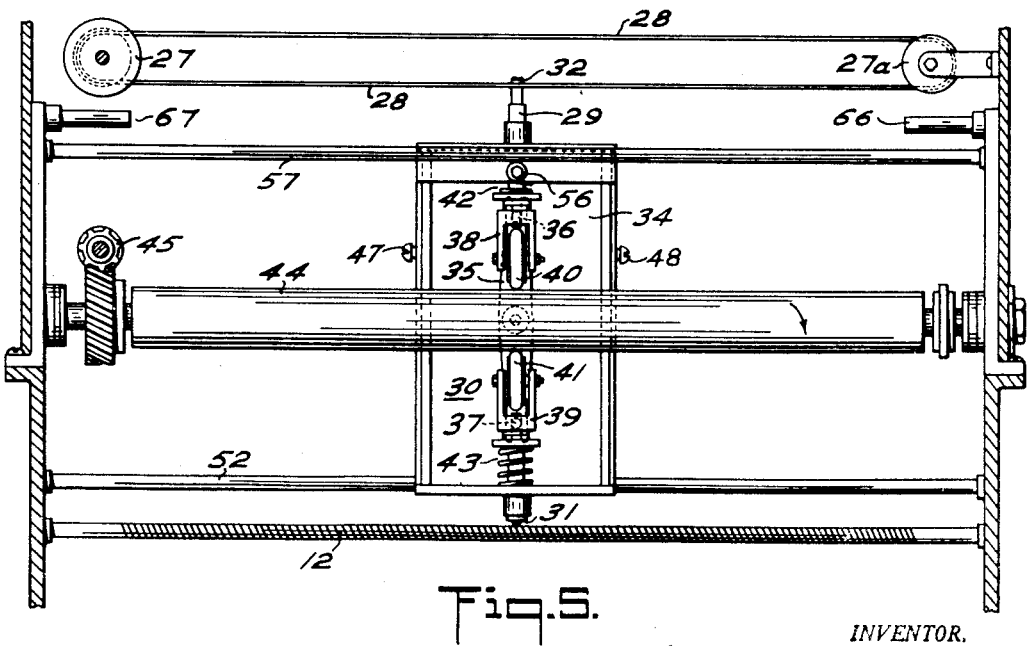
Fig. 5 is a rear view of the apparatus of Figs. 2 and 4 and, in part, is substantially the same as Fig. 3 but with the driving elements in neutral position.

The essential details of the mechanism 30 have been illustrated in Figs. 2-5. Referring particularly to Fig. 4, the motor 24 is illustrated as driving the pulley 27 which in turn drives the cord or belt 28, which passes over the pulley 27a. The control arm 29 has one end suitably secured, as by a clamp 32, to the cord 28. The opposite end, 29a, of the arm 29, is secured to a short stub shaft 33 which is journaled in a carriage or carriage-plate 34. A second arm 35, Figs. 2, 3 and 5, is secured to the inner end of stub shaft 33. The respective ends of the arm 35 are bifurcated, Fig. 3, to receive adjusting or positioning arms 36 and 37 respectively secured to and extending from wheel-supporting members 38 and 39. Accordingly, upon movement of the control lever 29 in a clockwise direction, as viewed in Fig. 3, the wheel-supporting member 38 is rotated in a clockwise direction as viewed from the top, while the wheel-supporting member 39 is simultaneously rotated in a counterclockwise direction, as viewed from the top of the mechanism. These members 38 and 39 respectively support driving elements or wheels 40 and 41 and also carry springs 42 and 43 which press the wheels toward and against a cylindrical roller 44. Though the provision of the two wheels 40 and 41 have certain advantages, only one of them is essential. They both function in the same manner except on opposite sides of the roller 44. The roller 44 is driven at substantially constant speed through helical gears 45 by means of a motor 46. The carriage plate 34 is provided with adjustable stops 47 and 48 to limit the rotation of the lever 29.

The members 38 and 39, Fig. 2, are journaled in and carried by the light-weight carriage or plate 34, and to which are secured a pair of lower rollers 50 and 51, Fig. 4, grooved to follow a supporting track 52, a pair of upper rollers 53 and 54 grooved to follow an upper track 55, and a roller 56, Figs. 2, 3 and 5, which bears against an upper track 57. The carriage 34 is mounted for horizontal translation along the tracks 52, 55 and 57 with a minimum of resistance to movement thereof. The carriage 34 is moved in one direction or the other in accordance with the positions of wheels 40 and 41. When the axes of the wheels 40 and 41 are parallel to the axis of the roller or cylinder 44, the carriage remains stationary. The control lever 29 is then in its neutral position, illustrated as the vertical position in Figs. 4 and 5.

With the roller 44 rotating in a counterclockwise direction, as viewed in Fig. 2 (and in the other views as indicated by arrows), movement of the control lever 29 in a clockwise direction, as viewed in Figs. 3 and 5, will cause the carriage to move toward the right. When the control lever 29 is moved in a counterclockwise direction from its neutral position, as viewed in Figs. 3 and 5, the carriage will move to the left. In other words, the carriage 34 follows the movement of the upper end of the control lever 29. The described driving mechanism produces a speed of movement of the carriage which varies at a rate which is closely related to the extent of deflection or rotation of the control lever 29; i. e., the greater the deflection of the control lever 29 from its neutral position the greater is the speed of the carriage.

The carriage 34 also supports the contact 31 which bears upon the slidewire 12. Also secured to the carriage 34 is a bracket 60, Fig. 2, for a recording pen 61 arranged in cooperative relation with a record chart 62. The bracket 60 also carries a pointer or index 63 arranged in cooperative relation with a scale 64. For additional details of the recording mechanism and cooperating index and scale, reference may be had to Ross et al. Patent No. 2,074,118, of March 16, 1937, particularly Figs. 1 and 5 thereof.

Should the control lever 29 remain in a deflected position as the pen 61 approaches one limit or the other of the chart 62, as for example, if cord 28 breaks or the quantity being measured has a value beyond the range of the instrument scale, it will engage one of stops 66 and 67. For example, with carriage 34 moving to the left, as shown by the broken-line illustration thereof in Fig. 4, it will be seen the upper end of control lever 29 will soon strike the stop 66. Continued movement of the carriage 34 will return the lever 29 to its neutral position and the carriage 34 will come to standstill with the pen 61 in a predetermined position, for example, at or just beyond the normal limits of the calibrated portion of the chart 62. The stop 67 performs like functions when the carriage 34 moves the lever 29 against it.

The torque amplifier or servo-mechanism 30 is characterized by the complete independence of operation of the control lever 29 from that of the carriage 34. With the control lever 29 in a deflected position for maximum speed of movement of the carriage 34, there is no force applied to the control lever 29 by the carriage 34. This feature, the new mode of operation, is obtained by locating the pivotal axis of each of the members 38 and 39 so as to intersect the axis of rotation of the corresponding wheels 40 and 41. Each such pivotal axis then intersects the axis of rotation of the roller 44. By providing a common pivotal axis for members 38 and 39 and a yoke or frame such as carriage 34, the springs 42 and 43 may strongly bias the wheels 40 and 41 against the roller 44 without transmission of the biasing force to any other part of the system. When the rotational axes of the wheels 40 and 41 are parallel to the axis of roller 44 they track and retrack a circle around the cylinder or roller 44. There is no component of force applied to the carriage.

When the control lever 29 is moved from its neutral position the wheels 40 and 41 are bodily turned about their common pivotal axis, Fig. 3. Their axes of rotation are then angularly disposed with respect to the axis of the roller 44. With the wheels 40 and 41 in said angular positions, they then track along a path which forms a spiral around and along the roller or cylinder 44, thus imparting transverse movement to the carriage 34. The carriage 34 moves in a direction normal to the pivotal axes of wheels 40 and 41. Thus the transverse movement of the carriage 34 is parallel to the axis of roller 44 and it is in a direction at right angles to the pivotal axes of wheels 40 and 41. Therefore, there is no possibility of application of torques tending to rotate the wheel supports 38 and 39 about the aforesaid pivotal axes. Hence the controlling means 29 is isolated from the reaction forces which move the carriage 34. Even though the speed of the carriage 34 be at a maximum, the wheels 40 and 41 may be returned to their neutral positions with no greater, and no less, effort than was required to move them therefrom.

In terms of operation, the carriage 34 appears to lack inertia. It does not tend to overtravel or undertravel. It moves at a rate which closely follows the movement of the control lever 29. There is no tendency for creep to appear and the mechanism 30 operates with a high mechanical advantage.

Again referring to Fig. 1, in conjunction with Figs. 2-5, an impulse applied to the motor 24 produces a mechanical signal which determines the position of the upper end of lever 29. Upon application of an impulse to the motor 24, it rotates through an angle related to the time integral of the impulse and in a direction dependent upon the polarity of the impulse. This rotation, by means of cord 28, produces a corresponding movement of clamp 32 attached to the upper end of the control lever 29.

It will now be understood that the instant the clamp 32 moves the upper end of control lever 29 from its neutral position the carriage immediately follows that movement. So long as the upper end is moving, the carriage continues closely to follow such movement. As the clamp 32 slows down, the carriage also slows down and when the clamp 32 comes to standstill, the carriage comes to standstill immediately thereafter. Thus, the potentiometer 11 is adjusted at a rate which closely follows the instantaneous magnitudes of the mechanical signal and by an amount which is proportional to the time integral of the applied impulse.

Now that the principles of the invention have been explained, it will be readily understood that the particular mechanical mechanism described, though new in its present application, is intended to be exemplary of servo-motor mechanisms of the type in which the primary motion is repeated either directly or proportionately. The mechanism itself may be electric, hydraulic, or of the mechanical type, the important requirements being that the servo-mechanism shall produce negligible reaction against the primary or controlling action and that the mechanism shall be capable of closely following the control signal, regardless of its character; i. e., it need not be mechanical or electrical in character.

In accordance with the foregoing, another embodiment of the invention comprises electrical circuits for changing the initial impulse or impulses into electrical control signals, which in turn are utilized to control a motor which drives the adjusting means in the measuring circuit. A preferred embodiment of this form of the invention has been illustrated in Fig. 6 as applied to the measurement of an electromotive force which may be derived from any suitable condition-responsive device broadly indicated at 70, such for example as pH measuring systems, including measuring electrodes of glass or iridium. These systems have a very high electrical resistance. The current which may be drawn from such systems is too small for the operation of the system of Fig. 1. As shown, the current from device 70, by means of a single pole double throw switch 73, is applied to a capacitor 74 connected in circuit with the potentiometer 11. After a predetermined time interval, of the order of several tenths of a second, a cam 75, driven by a constant speed motor 76, operates the switch 73 to its second position to transfer the capacitor 74 to the input circuit of an amplifier which includes electric valves 77 and 78. It will be observed from the shape of cam 75 that the switch 73 momentarily connects capacitor 74 to the input circuit of the amplifier. The connection, however, is long enough for the transfer to the input circuit of an impulse, which may be positive, negative, or zero, depending upon the unbalance voltage in the measuring circuit, which circuit includes the potentiometer 11 and the condition-responsive device 70.

Referring to Fig. 9, the impulse may be of the form shown by the curve 80, plotted with time as abscissae and amplitude as ordinates. It will be assumed this positive impulse 80 is produced when the voltage of the condition-responsive device 70 is less than that derived from the potentiometer 11. The impulse 80 is of short duration, as produced by the rapid discharge of the capacitor 74 through a resistor 81 of relatively low resistance (of the order of 100,000 ohms). The resultant voltage developed across resistor 81 is applied by capacitor 82 to the grid of the valve 77. The usual grid resistor 83 is provided, together with a shunting capacitor 84 which is effective to bypass to ground any spurious alternating current which may appear in the input circuit.

The amplifier itself is more or less conventional and includes circuits of the type illustrated in Figs. 7 and 8. Coupling capacitors such as 82, with a shunting resistor such as 83, not only transmit the pulse but they also introduce a negative pulse; they transform the original pulse into one which crosses the zero line. A circuit of this type will be recognized in the input circuit of the tube 78, and comprises a capacitor 85 with a shunting resistor 86. These circuits produce a damped oscillation in the amplifier.

Where there is a resistance in series with a capacitor, Fig. 8, corresponding with plate resistor 87 with a shunting capacitor 88, the effect is to delay and lengthen the applied impulses. Thus, at the output of the amplifier, which may include a number of tubes, only two of which have been illustrated, an output pulse will appear of the general shape as indicated by the curve 89 of Fig. 9. Further to delay and lengthen the output impulse or the control signal, a series resistor 90 and a shunting capacitor 91 are provided. As will be later explained, several additional delay circuits may be provided, or the amplifier itself may be especially designed so as to contain a sufficient number of such circuits, or circuits which will function in accordance with the requirements of the present invention.

Further in accordance with the invention, synchronized operation is provided between the switch 73 and a switch 93 provided in the output circuit. In terms of operation, the cam 75 at time $T_1$ operates the switch 73 for production in the input circuit of the pulse 80. A short time thereafter, at time $T_2$, a cam 93a closes the switch 93 to apply the amplified impulse 89 to the output circuit, which includes the resistor 90 and the capacitor 91. The resultant impulse, now the control signal, as it appears across conductors 94 and 95, is of the general shape indicated by the curve 96 of Fig. 9. Before the time $T_4$, when the signal 89 reverses polarity, as for example at the time $T_3$, the switch 93 is opened.

Though other control networks may be utilized, the impulse 96 is applied to the input circuit of an electric valve 98 by way of resistor 99 and by way of the conductor 95, the ground connection, and the cathode biasing means 103. The output circuit of the valve 98 includes one primary winding of a transformer 106, a unidirectional source 104, and an alternating current source connected to transformer 105. The other primary winding of transformer 106 is connected in the output circuit of an electric valve 107, which circuit includes the cathode biasing means 103 and the two sources 104 and 105. There is applied to the input circuit of the valve 107 the bias developed across the cathode biasing means 103.

It will also be observed there is included in the input circuit of the valve 98 (in the output circuit of the amplifier including tube 78) a mixer circuit comprising resistors 99 and 113, the latter being connected in series with a variable source of electromotive force 114, shown in the form of a magneto tachometer. This tachometer 114 is driven, as indicated by the broken line 115, by a motor 116 which serves to adjust the relative position of the resistor 12 and the contact 31 of the potentiometer 11, as indicated by the broken line 117. The mixer circuit 99—113 applies a voltage to the input circuit which is proportional to the instantaneous difference between predetermined fractions of the voltages of the control signal 96 and the tachometer 114. The instantaneous speed of motor 116 is proportional to the instantaneous voltage values of the control signal 96.

The control signal 96 is so shaped by the resistor 90 and the capacitor 91 that the derivative or rate of change thereof is finite. Therefore, the motor acceleration can be finite and the motor speed may closely follow the control signal 96 from start to finish. Since the speed of the motor 116 at every instant is proportional to the corresponding ordinate of the control signal 96, the distance through which the motor 116 moves the shaft 117, the slidewire 12, and the pen and index (not shown but corresponding with pen 61 and index 64 of Fig. 2, or of pen 12 and index 11 of said Patent 2,074,118) is proportional to the time integral of the control signal 96. The time integral of the control signal 96 is proportional to the potentiometer unbalance because of the provision of substantially linear circuits up to reisstor 90 and capacitor 91; i. e., they are linear as far as time integrals are concerned. Hence, the distance moved by the pen and index will be proportional to the potentiometer unbalance.

As shown in Fig. 6, the motor 116, preferably a split-field series motor, is under the control of a pair of grid-controlled rectifiers 120 and 121, preferably of the type known on the market as "Thyratrons." The output circuit thereof includes transformer 122 supplied from the same source of alternating current as the transformer 105, while the input circuit is connected across the secondary windings of transformer 106.

In the absence of input signals, the valves 98 and 107 are biased for equal flow of current therethrough. The primary windings of the transformer 106 are connected so that current flowing from the sources 104 and 105 divides at the transformer 106, one-half flowing through one primary winding and thence through the valve 98 while the other half flows in the opposite direction through the other primary winding and thence through the valve 107. The current again unites for flow through the biasing means 103 and thence back to the sources of supply.

Disregarding for the moment the effect of the tachometer 114, a control signal of positive polarity, such as the signal 96, Fig. 9, increases the current flow through the valve 98 and its associated primary winding. The result of the unbalanced current flow in the primary windings of the transformer 106 is the production across the secondary winding 106a of a voltage of polarity which it will be assumed will fire the "Thyratron" 121, which then delivers a series of impulses to the motor 116. The instantaneous magnitudes of the positive pulse applied to the "Thyratron" 121 are related to the instantaneous magnitudes of the applied signal 96 and to some degree, the greater the instantaneous magnitudes the sooner in each half cycle will the "Thyratron" 121 fire. Since alternating current is applied to both the input and output circuits of the "Thyratron" 121 there will be the succession of impulses applied to the motor 116. For sixty-cycle alternating current, there may be sixty pulses per second. For alternating current of higher frequencies there may be correspondingly more pulses per second. The control signal itself may have a maximum duration of a second or less.

The succession of unidirectional current pulses applied to the motor 116 energizes it for rotation in a direction relatively to move the slidewire 12 and contact 31 so as to decrease the voltage derived from the potentiometer 11.

Upon rotation of the motor 116, the tachometer 114 produces an instantaneous voltage proportional to the instantaneous speed thereof. The polarity of the voltage of the tachometer 114 is such that the magnitude of the signal-voltage applied to the grid of tube or valve 98 is decreased. If the instantaneous tachometer voltage entirely compensates for the instantaneous voltage of the control signal 96, the voltage across secondary winding 106a will disappear. Thus, the number of cycles during which the "Thyratron" 121 conducts current is so controlled that the instantaneous speed of the motor 116 is proportional to the instantaneous voltage-values of the control signal 96. In consequence, the motor 116 relatively adjusts the slidewire 12 and contact 31 through a distance proportional to the unbalance. This means that the measuring circuit is rebalanced within the time of one cycle of operation of the switch 73. Should there be any residual unbalance, there will be applied to the input circuit of the valve 77 an impulse 124, Fig. 9. The time $T_{11}$ corresponds with the closure of switch 73. This occurs at the end of the negative half cycle 123. As before, the impulse 124 is amplified, as indicated at 125. At the time $T_{12}$, the switch 93 again closes to apply the impulse 125 to the transforming circuit including resistor 90 and capacitor 91. The resultant control signal 126 is applied to the input circuit of the valve 98, and the operations described above for the control signal 96 are again carried out. At the time $T_{13}$ the switch 93 is again moved to its open position.

With a negative impulse, as may occur when the voltage from the condition-responsive device exceeds that derived from the potentiometer 11, it will be understood the operations will be similar to those above described. A control signal of negative polarity as applied to the valve 98 will decrease the current flowing therethrough. Positive impulses will then be applied to the "Thyratron" 120 for energization of the motor 116 in the opposite direction, that is, to increase in the measuring circuit the voltage derived from the potentiometer 11.

Though the provision of the direct current source 104 is not essential, it is preferably provided to insure the production from the alternating current from transformer 105 of control voltages in the secondary windings of transformer 106 of sinusoidal character. Though other circuit constants may be utilized, in the foregoing embodiment of the invention the resistor 90 was one megohm; the capacitor 91 was four microfarads; the resistors 99 and 113 were each one megohm. The valves 98 and 107 though shown herein as separate valves, were included in the same envelope of a 6N7 type of tube. The "Thyratrons" 120 and 121 were of the FG27–A type. The voltages of the sources 104 and 105 were respectively 200 volts D. C. and 150 volts, 60 cycles.

Referring now to Fig. 10, there has been illustrated an alternative form of control system for the motor 116. Also, in place of the resistor 90 and the capacitor 91 of Fig. 6, there has been provided in Fig. 10, an inductor 91a and resistor 90. In both cases the resistor 90 and the reactor 91 or 91a are connected in series with respect to the applied impulse from the amplifier. In Fig. 6 the capacitor is in shunt with the input circuit of valves 98 and 107, while in Fig. 10 the resistor 90 is in shunt therewith. In both cases, the applied impulse is lengthened and its shape changed so that the rate of charge thereof is finite and can be closely followed by the motor 116. The control signal 96, Fig. 9, with its shape determined by the inductor 91a and the resistor 90, is applied across the conductors 94 and 95. The valves 98a and 107a in general function the same as the valves 98 and 107 but their specific operation differs. Therefore, the subscript $a$ has been added. These valves, 98a and 107a, serve to control the firing of the "Thyratrons" 120 and 121 which are again shown connected in circuit with the split-field series motor 116, both fields 116a and 116b being shown.

There has also been illustrated the driving connection 115 for the tachometer 114, as well as a recording chart or scale 62a provided with a pen 61a driven by any suitable means, such, for example, as a cord, belt or violin-string 125 threaded over pulleys, one of which is driven by the motor 116. As in Fig. 6, a common source of alternating current supplies the primary winding of transformers 105 and 122. Instead of the battery of Fig. 6, there is provided in Fig. 10 a rectifier shown as a diode 126 supplied from the secondary of transformer 105 through a resistor 127 shunted by a capacitor 128. It will also be observed that resistors 129 and 130 serve to divide the voltage between conductors 131 and 132. The conductor 133 connects the junction point of resistors 129 and 130 to the conductor 95, which leads directly to the grid of valve 107a, and through the tachometer 114 and resistor 113 to the grid of the valve 98a. A resistor 134 is included in the common cathode circuit of valves 98a and 107a.

In the absence of a control signal a pulsating current flows through the valves 98a and 107a. The direct current source, including the diode 126 and the R.-C. combination 127—128 applies a substantially constant direct current voltage to the anodes of the tubes 98a and 107a. The alternating current from the secondary winding of transformer 105 superimposes upon the direct current plate voltage an alternating current voltage. In this manner there is applied to the anodes of tubes 98a and 107a a pulsating voltage whose wave form will be like that shown by the curves 135, 136 and 137 of Fig. 11. Current flowing by way of conductor 131 will divide in the primary winding of transformer 106 and will flow in opposite directions therethrough. From the respective ends of the transformer winding the current will flow through the valves 98a and 107a. The current will combine in a return circuit which includes a common cathode resistor 134.

If a greater total current tends to flow, the potential drop across the cathode resistor 134 increases and this increases the negative bias applied to the grids of valves 98a and 107a to reduce the current flow therein. If a lesser total current flows, the potential drop across the cathode resistor 134 decreases and this decreases the negative bias applied to the grids of the valves 98a and 107a to increase the current flow therein. The overall effect is to maintain substantially constant the total current flowing through the valves 98a and 107a. The control action now to be described depends upon the difference between the currents flowing through the respective valves.

The effect of a positive control signal upon the input circuit of valve 98a is to make the grid thereof more positive with respect to its cathode than the grid of valve 107a. In consequence, a greater current flows through the valve 98a and less current flows through the valve 107a. Consequently, the unequal division of the current flowing in the opposite halves of the primary winding will produce excitation thereof for generation of a voltage in the secondary windings. The polarity of the voltage impulse in the secondary winding is definitely determined since it will always be of one polarity when the current through the valve 98a exceeds that through the valve 107a; and it will always be of opposite polarity when the current through the valve 107a exceeds the current through the valve 98a. The voltage induced in the secondary windings of the transformer 106 will be of peaked shape by reason of the circuit arrangements of the diode 126 and the R.-C. combination 127—128. More specifically, it will be observed that the conductor 131 is connected at the juncture of the cathode of diode 126 and the R.-C. combination 127—128.

As well understood in the art, the capacitor 128 and the resistor 127 serve to maintain substantially constant the D. C. component of the voltage applied between conductors 131 and 132. Inspection of the circuit connections shows that when current flows through the diode from the anode to cathode thereof, the cathode must be negative with respect to the anode. Because of the anode-cathode drop in the diode 126, there will then be produced a substantial negative bias which is applied to the grids of the valves 98a and 107a, by way of the voltage divider 129—130, and the conductors 133 and 95. Pictorially, Fig. 11, the voltage across conductors 131 and 132 first consists of a positive pulse 135 composed of the D. C. component and the A. C. component from the secondary of transformer 105. At the time $T_{20}$, current begins to flow through the rectifier 126, again to charge the capacitor 128 to its original value. The drop across the rectifier or diode 126 produces a negative impulse 136. It is followed by a second positive impulse 137. The effect of the negative impulse 136 is abruptly to render the valves 98a and 107a non-conductive. The abrupt termination of the current flow in the primary winding of transformer 106 is to cause the magnetic field quickly to collapse, thereby generating a voltage impulse of peaked wave form in the secondary winding thereof. The induced impulse will tend to make the grid of one of the "Thyratrons" more negative and, hence, will have no effect, and it will render the grid of the other of the "Thyratrons" positive and thereby cause it to fire. It will be assumed that the positive signal applied to the grid of valve 98a produces a pulse which renders the grid of "Thyratron" 120 positive with respect to the cathode thereof.

As described in connection with Fig. 6, the firing of the "Thyratron" 120 energizes the motor 116, including its field winding 116a, for rotation at a speed which is proportional to the rate of change of the voltage of the control signal and in a direction to produce balance of the measuring circuit. A control signal of negative polarity, of course, increases the current flow through the valve 107a and decreases the current flow through the valve 98a. When the diode 126 again renders the grids of the valves negative, the "Thyratron" 121 will fire and the motor 116 and its field winding 116b will be energized for rotation in the opposite direction.

In both cases, the speed of the magneto tachometer 114 corresponds with the speed of the motor 116 at each instant and so modifies the control signal as applied to the tube 98a or the tube 107a as to make the instantaneous speed of the motor 116 proportional to the instantaneous magnitudes of the control signal. Therefore, the distance through which the motor 116 drives the driving element 115, the pen 61a, and the potentiometer-adjusting means driven by the element 117, is proportional to the time integral of said control signal, which, of course, is proportional to the time integral of the unbalance impulse from the potentiometer or measuring circuit.

As stated in connection with Fig. 6, a large impulse will produce earlier firing of one or the other of "Thyratrons" 120 and 121 than an impulse of lesser magnitude. This is self-evident from an inspection of Fig. 12 where the rise of voltage from the larger pulses in the secondary windings of the transformer 106 is at a much greater rate than for the pulses of less amplitude. Specifically, the voltage pulses 138 and 140 may be produced by positive control signals of greater and less amplitudes, while the voltage pulses 139 and 141 may be produced by negative control signals of greater and less magnitudes.

While the firing of the "Thyratrons" 120 and 121 has been described for a single operation, it will be understood that for each control signal having a duration of the order of one second or less, there will be many operations of one or the other of the "Thyratrons" 120 and 121. For example, should the "Thyratron" 120 be conductive for a number of successive half cycles, the speed of motor 116 may tend to increase above what it should be. If this occurs, the voltage introduced into the input circuit by the tachometer 114 will increase and may prevent the firing of "Thyratron" 120 for one or more cycles or it may produce firing of "Thyratron" 121 for one or more cycles, quickly to reduce the speed of motor 116. There is positive and accurate control of the speed of motor 116 so that its speed is proportional at all times to the instantaneous magnitudes of the control signal.

In Fig. 13 the invention is shown as applied to a telemetering system of the duration type; i. e., one in which a transmitter 150 controls the time of closure of a switch 151 in accordance with variations in the magnitude of a condition as determined by a measuring instrument 152. This transmitter may be of the type disclosed in Doyle Patent No. 2,336,929 of December 14, 1943. The impulses, having lengths determined by the magnitude of the condition under measurement, are applied to a receiver 153 which includes an operating coil 154 of a magnet arranged to operate an escapement mechanism 155, which controls the rotation of a shaft 156. The shaft 156 is biased for rotation in a clockwise direction by means of a spring 157 secured at one end to the shaft and at the opposite end to an arm 158 rotated by a torque motor 159. Suitable gearing 160 may be interposed between the driving arm 158 and the motor 159. The parts are illustrated in their respective positions corresponding with the application to the receiver 153 of an impulse from the transmitter 150.

Accordingly, the escapement mechanism has an arm 162, pivoted at 162a, disposed in the path of a projection 163 to hold the shaft 156 stationary. The contact arm 73a, secured to the shaft, is held in its first circuit-closing position to complete a circuit from the battery 13 through a resistor 164 and the switch 73a, thereby to charge the capacitor 74 so long as the switch 73a remains closed on the first point. As soon as the impulse from the transmitter 150 is terminated, as by the opening of the switch 151, a spring 165 rotates the arm 162 to release the projection 163. Thereupon the spring 157 rotates the shaft 156 and the switch arm 73a in a clockwise direction. The initial rotation of the shaft is at high speed and corresponds with movement of the switch 73a through its second and third circuit-closing positions. In the second position, the capacitor 74 is connected to the input circuit of the amplifier which includes the resistor 81 and the coupling capacitor 82. If the voltage of capacitor 74 is higher than that determined by the relative positions of contact 31 and slidewire 12, a portion of the charge is transferred to the input circuit of the amplifier through coupling capacitor 82. If the voltage of capacitor 74 is lower than that determined by the relative positions of contact 31 and slidewire 12, the capacitor 74 is further charged by flow of current through resistor 81. This produces a voltage on the grid of tube 77 of opposite sign to that of the previous case. If the voltage of capacitor 74 is equal to that determined by the contact 31 and the slidewire 12, no voltage will be applied to the grid of tube 77.

In the third position, the switch 73a short-circuits the capacitor 74 to insure the complete removal of the charge remaining thereon. The impulse delivered to the valve 77 depends upon the difference between the voltage on the capacitor 74 and that developed by the potentiometer 11, this part of the circuit being similar to that already described at length in connection with Fig. 6.

The impulse, after application by the electric valve 77 and the remaining valves, will be lengthened and delayed, as already explained, and the resultant control signal will control operation of the adjusting means 117 of the potentiometer 11. A braking means, comprising a conductive disc 166 secured to the shaft 156, is arranged to pass through a strong magnetic field provided by a magnet 167 to slow down the shaft during that period in which the segment 168 engages the contact of switch 93. This corresponds with the time interval during which the control signal is applied to the motor control circuits, as earlier explained in connection with the operation of the switch 93 of Fig. 6.

At the end of this time interval the switch 93 is opened and the projection 163 comes to rest against the end 162b, of arm 162, preparatory to the reception of a further impulse from the transmitter 150. When this impulse arrives, the magnet 154 operates the escapement arm 162 to release projection 163, which is thereupon rotated by the shaft until the projection again occupies its illustrated position.

It will be observed the invention lends itself to telemetering systems of the duration type in that the system is capable of rapidly and accurately recording the duration of successive telemetering signals. In general, this may be accomplished in one balancing operation.

The invention lends itself to the measurement of magnitudes of continuous magnetic flux, existing in the neighborhood of conductors carrying large direct currents. In applications of this character, the instantaneous magnitudes of voltage generated in the search coil are of no importance. However, the strength of the magnetic field is determined in terms of the time integral of the induced voltage; i. e., in terms of volt-seconds. Accordingly, Fig. 14, a search coil 170 is carried by the shaft 156 for rotation in the magnetic field which surrounds a bus bar or heavy conductor 171 which may form a part of a direct current circuit, not shown. To concentrate the magnetic field, a surrounding magnetic core 172 may be provided with the spaced ends thereof disposed adjacent to the coil 170. As shown, the shaft 156 is retained in a stationary position by means of an escapement mechanism 155 which includes an arm 162 disposed in the path of a projection 163, carried by the shaft 156. The shaft is biased for rotation in a clockwise direction by means of a spring 157 in manner already described in connection with Fig. 13.

It will be observed that one end of the coil 170 is connected to a conducting segment 173 of a disc 174, of insulating material, and thence by conductor 175 to one side of the measuring circuit which includes the capacitor 82 and the electric valve 77. The other side of the coil 170 is connected directly to one side of a coil 176, the opposite side of which is connected through a slip ring 177 and by conductor 178 to a switch 179. This switch is illustrated in the open position. It is closed upon energization of an electromagnet 180 which also serves to operate against the bias of spring 165, the arm 162, to disengage the projection 163. This releases the shaft 156 for rotation under the bias of the spring 157.

The energization of the electromagnet 180 is under the control of a time-switch 182, operated by a constant speed driving means 183. When the switch 182 closes to complete a circuit through the segment 184, the magnet 180 is energized from a suitable source of supply, as indicated by the battery 185. Accordingly, the escapement mechanism is operated to free the shaft and the switch 179 is closed to connect the conductor 178, by way of the spring 165 and the conductor 186 to the capacitor 82. Hence, as the coils 170 and 176 are rotated by the spring 157, the resultant voltage generated thereby is applied to the input circuit of the electric valve 77. After the shaft and the coils 170 and 176 have rotated through 180°, the projection 163 comes to rest against the end 162b of the arm 162. Thus the resultant voltage from the coils 170 and 176 is applied only through the aforesaid 180° rotation thereof. The voltage induced in the coil 170 will be dependent upon the strength of the field through which its turns pass and the speed of rotation thereof. The voltage induced in the coil 176 will likewise depend upon the strength of the field through which its turns pass and the speed of rotation thereof. These coils are connected in opposition and stationary exciting windings 188 and 189 are provided to produce separate field excitation for the coil 176. The intensity of the magnetic field separately produced across the coil 176 depends upon the relative setting of the contact 31a with respect to its associated slidewire 12a. This slidewire forms a part of a measuring circuit including a resistor 190 and a source of supply 13a. It will be observed that the contact 31a is positioned by the driving means 117, in manner similar to that fully described in connection with Figs. 6 and 13.

The time-switch 182 maintains the energizing circuit for the electro-magnet 180 during a time interval adequately long to insure completion of the rotation of the coil 170 through the aforesaid 180°. Thereafter, the switch 182 is operated to de-energize the electromagnet 180. Thereafter, the switch 182 completes a circuit through its contact 192 to energize the operating coil 193 of the switch 93a. The switch 93a serves the same function as has been fully described above for switch 93.

In contrast with the systems of Figs. 6 and 13, it will be observed that the search coil 170 and the associated coil 176 apply a voltage directly to the input circuit including the capacitor 82. However, as explained in connection with Fig. 9, the applied voltage is amplified and a control signal is eventually produced by means of which the relative position between slidewire 12a and its contact 31a is representative of the strength of the magnetic field surrounding the bus bar or conductor 171.

As soon as the timing switch 182 opened its circuit through the segment 184, the electromagnet 180 was, of course, de-energized. The spring 165 thereupon operated the arm 162 in a counterclockwise direction to release the projection 163 from the inturned end 162b. The spring 157 was thereupon effective to rotate the shaft 156 until the parts again occupy the positions illustrated in Fig. 14, with the projection 163 again engaging the upper inturned end of the arm 162, preparatory to a further operation. During this return movement it will be observed the switch 179 is maintained in its open position. Also, during the return movement conducting segment 173 is out of engagement with its associated brush to interrupt the amplifier input circuit from the coils 170 and 176. In this manner, the resultant voltage produced by these coils during the return movement is not applied to the amplifier input circuit.

As already indicated, the coils 170 and 176 are connected so that the voltages induced therein oppose each other. The difference or resultant voltage is applied to the input circuit of the valve 77. If the voltage induced in the coil 176 is greater than that induced in the coil 170, an impulse of one polarity is applied to the input circuit. If the voltage of coil 176 is less, the applied impulse will be of opposite polarity. In each case the magnitude or amplitude of the applied impulses will be related to the extent of the difference or resultant voltage. The control signal produces adjustment of the measuring circuit 11 so as to change the excitation of the coils 188 and 189 by an amount which will produce the same voltage, the same volt-seconds by the coil 176 as by the coil 170, other factors remaining the same. Hence, the relative position between the slidewire 12a and the contact 31a is related to the intensity of the magnetic field surrounding the bus bar or conductor 171.

Heretofore, the measurement of the intensity of the radiations from X-ray tubes has been difficult and no satisfactory measuring and recording system has been marketed. The present invention lends itself to this difficult application, as shown in Fig. 15. An ionization chamber 195 is arranged with respect to the X-ray tube 196 so as to receive a portion of the radiation therefrom. For example, if the radiation is utlized for therapeutic treatments, the ionization chamber 195 may be superimposed over the area to be treated. Thus, the intensity of the radiation applied to the ionization chamber will be the same as that applied to the area to be treated. Similarly, the ionization chamber may be superimposed over other areas to be examined, such, for example, as in the X-ray examination of metals, and the like. The ionization chamber itself comprises an envelope filled with a suitable gas, within which are disposed a pair of electrodes. A window 195a is provided through which the radiation passes. This chamber has the characteristic that upon application thereto of a relatively high voltage, provided by a suitable source such as a battery 197, current will flow, the magnitude of which may be of the order of 100 micromicroamperes ($10^{-10}$ amperes). The particular current flowing will be dependent upon the intensity of the radiation. In dealing with currents of such small magnitude, it is necessary to use amplifying tubes, the input tube having the characteristics of an FP54 tube. Such a tube is characterized by substantially zero grid current.

Accordingly the tube 198, of the FP54 type, in the system of Fig. 6 may replace the tube 77, with the remaining circuits as illustrated in Fig. 6. It will also be remembered that in Fig. 6 additional stages of amplification may be present though they have not been illustrated. The input circuit of the tube 198 differs from Fig. 6. Specifically, Fig. 15, the control grid is permanently connected through a high resistance resistor 201 (of the order of 100 megohms) to ground. The cathode is also connected to ground.

A switch 202 is operable in succession through three positions. In its first position, the switch 202 connects a capacitor 203 in series-circuit relation with a potentiometer 11. The capacitor 203 is thereupon charged by an amount depending upon the relative setting between the contact 31 and the slidewire 12. It will be observed the capacitor 203 is also connected in series-circuit relation with the ionization chamber 195 and the battery 197. It will also be observed the negative side of the battery 197 is connected to ground. Consequently, upon movement of the switch 202 to its second and open position, the capacitor 203 is disconnected from the charging circuit but remains connected in circuit with the ionization chamber 195. The charge on the capacitor 203, as acquired from the potentiometer 11, is of a polarity opposite to that produced by current flowing through the circuit including the ionization chamber 195. Hence, the flow of current through the ionization chamber 195 will neutralize or tend to neutralize the initial charge on the capacitor 203. In the third position of the switch 202 the capacitor 203 is connected across the input circuit of the tube or valve 198. If there is no charge on the capacitor, no signal will be applied to the tube. If the original charge on the capacitor 203 has not been completely neutralized, an impulse of negative polarity will be applied to the control grid. If the original charge has been more than neutralized; i. e., the original charge neutralized and the capacitor charged in the opposite direction by the current flowing through the ionization chamber 195, then an impulse of positive polarity will be applied to the tube 198. In either case, the applied impulse will be transformed by the amplifier and the subsequent circuit elements so as to convert it into a control signal which is then utilized to control the operation of the motor 116 (Fig. 6) to reposition through the driving element 117, the relative position between the slidewire 12 and the contact 31. As in the preceding modifications of the invention, the relative position between the slidewire 12 and the contact 31 is a measure of the magnitude of the condition under measurement, in this case, the intensity of the radiation applied to the ionization chamber 195.

It is to be understood that the measurement of currents of the order of $10^{-10}$ amperes is made possible by utilizing the current flow over a predetermined time interval. As shown, this time interval may be of the order of one second, representing the time during which the switch 202 is in its open position. The switch, through a suitable drive (not shown) may be retained in its first and third positions for shorter time intervals. It remains in its first position long enough for the completion of the last rebalancing operation by the driving member 117. This assures that the newly acquired charge of the capacitor 203 will correspond with the setting of driving element 117 as produced by the last impulse applied to the tube 198.

While preferred embodiments of the invention have been described, it will be understood that further modifications may be made without departing from the spirit and scope of the invention as set forth in the appended claims.

What is claimed is:

1. In a self-balancing measuring system including an electrical circuit and adjusting means for producing circuit balance thereof, the combination of means including said circuit for producing at spaced intervals an impulse proportional to unbalance of said circuit, driving means for moving said adjusting means at a variable rate, means comprising an energy-storing device and an energy-dissipating device for storing the energy of each impulse and for dissipating that energy at that finite rate at which said driving means can adjust said element to transform said impulse into a control signal whose amplitude changes at a rate no greater than said driving means can move said adjusting means, and means operable by said signal for controlling said driving means to operate said adjusting means at a rate which closely follows the instantaneous magnitudes of said signal and through a distance which is proportional to the time integral of said impulse.

2. In a self-balancing measuring system including an electrical circuit and adjusting means for producing circuit balance thereof, the combination of means including said circuit for producing at spaced intervals an impulse proportional to unbalance of said circuit, driving means for moving said adjusting means at a variable rate, means comprising an energy-storing device and an energy-dissipating device for storing the energy of each impulse and for dissipating that energy at that finite rate at which said driving means can adjust said element to transform said impulse into a control signal whose amplitude changes at a rate no greater than the maximum rate at which said driving means can move said adjusting means, and means jointly responsive to said signal and to the movement of said adjusting means for controlling said driving means to operate said adjusting means at a rate which closely follows the instantaneous magnitudes of said signal and through a distance which is proportional to the time integral of said impulse.

3. In a self-balancing measuring system including an electrical circuit and adjusting means for producing circuit balance thereof, the combination of means including said circuit for producing at spaced intervals an impulse proportional to unbalance of said circuit, driving means for moving said adjusting means at a variable rate, means comprising an energy-storing device and an energy-dissipating device for storing the energy of each impulse and for dissipating that energy at that finite rate at which said driving means can adjust said element to transform said impulse into a control signal whose time integral is proportional to that of said impulse and whose amplitude changes at a rate no greater than the maximum rate at which said driving means can move said adjusting means, and means operable by said control signal for controlling said driving means to operate said adjusting means at a rate which is proportional to the instantaneous magnitudes of said control signal and through a distance which is proportional to the time integral of said impulse.

4. In a self-balancing measuring system including an electrical circuit and adjusting means for producing circuit balance thereof, the combination of an alternating current amplifier, means including said circuit for applying at spaced intervals impulses to said amplifier each of which is proportional to unbalance of said circuit, driving means for moving said adjusting means at a variable rate, means comprising an energy-storing device and an energy-dissipating device for storing the energy of each impulse and for dissipating that energy at that finite rate at which said adjusting means may be physically adjusted to transform each of said impulses into a control signal whose amplitude changes at a rate no greater than the maximum rate at which said driving means can move said adjusting means, means operable under the control of each said signal for controlling said driving means after application of each impulse and before application of the succeeding impulse to operate said adjusting means at rates which closely follow the instantaneous magnitudes of each said control signal and through a distance which is proportional to the time integral of the impulse which was transformed into the corresponding control signal.

5. In a self-balancing measuring system including an electrical circuit and adjusting means for producing circuit balance thereof, the combination of an alternating current amplifier having an input circuit and an output circuit, switches respectively disposed in said input and said output circuits and operable in timed relation one to the other, means including said switch and said input circuit for applying to said amplifier in succession and at spaced intervals an impulse proportional to unbalance of said circuit, driving means for moving said adjusting means at a variable rate, means comprising an energy-storing device and an energy-dissipating device operable upon closure of said switch in said output circuit for storing the energy of each impulse and for dissipating that energy at that finite rate at which said driving means can adjust said element to transform the amplified impulse into a control signal whose amplitude changes at a rate no greater than the maximum rate at which said driving means can move said adjusting means, and means operable by said control signal for controlling said driving means to operate said adjusting means at a rate which closely follows the instantaneous magnitudes of said signal and through a distance which is proportional to the time integral of said impulse.

6. In a self-balancing measuring system including an electrical circuit and adjusting means for producing circuit balance thereof, the combination of means including said circuit for producing at spaced intervals an electrical impulse proportional to unbalance of said circuit, driving means for moving said adjusting means at a variable rate, means comprising a resistor and a reactor connected in series-circuit relation for storing the energy of each impulse and for dissipating the energy at a rate to transform said impulse into a control signal whose amplitude changes at a rate no greater than that at which said driving means can move said adjusting means, and means operable by said control signal for controlling said driving means so as to operate said adjusting means at a rate which closely follows the instantaneous magnitudes of said signal and through a distance which is proportional to the time integral of said impulse.

7. In a self-balancing measuring system including an electrical circuit and adjusting means for producing circuit balance thereof, the combination of means including said circuit for producing at spaced intervals an electrical impulse proportional to unbalance of said circuit, driving means for moving said adjusting means at a variable rate, means including a resistor and a capacitor connected in series-circuit relation for storing the energy of said impulse and for dissipating it at a rate to transform said impulse into a control signal whose amplitude changes at a rate no greater than that at which said driving means can move said adjusting means, means operable by said driving means for producing a voltage proportional to the speed of said driving means, and means operable under the joint control of said control signal and said last-named voltage for controlling said driving means to operate said adjusting means at a rate which closely follows the instantaneous magnitudes of said control signal and to an extent which is proportional to the time integral of said impulse.

8. In a system having means for producing at spaced intervals an electrical impulse, the combination of means including a resistor and a reactor connected in series-circuit relation for storing and dissipating the energy of each impulse to transform it into a control signal whose amplitude changes at a rate lower than that of said impulse, variable speed-driving means, means for controlling the speed of said driving means in accordance with said control signal, and means continuously responsive to the speed of said driving means for so modifying the speed as to maintain it proportional to the instantaneous magnitudes of said signal thereby to produce rotation of said driving means to an extent which is proportional to the time integral of said electrical impulse.

9. In a self-balancing measuring system having adjusting means in an electrical circuit and operable to produce circuit balance thereof, the combination of means including said circuit for producing at spaced intervals an electrical impulse whose time integral is proportional to the unbalance of said circuit, means for amplifying said impulse, means including a resistor and a reactor connected in series-circuit relation for storing and dissipating the energy of each impulse to transform the amplified electrical impulse into a control signal whose amplitude changes at a rate lower than that of said impulse, variable speed-driving means for operating said adjusting means, means for controlling the speed of said driving means in accordance with said control signal, and means continuously responsive to the speed of said driving means for so modifying the action of said control means as to maintain the speed of said driving means proportional to the instantaneous magnitudes of said signal whereby said adjusting means is driven through a distance which is proportional to the time integral of said electrical impulse.

10. In a system including an electrical circuit and adjusting means for producing circuit balance thereof, the combination of periodically operable means including said circuit for producing upon each operation an electrical impulse whose time integral is proportional to unbalance of said circuit, means for amplifying said impulse, means including a resistor and a reactor connected in series-circuit relation for storing each impulse and dissipating the energy thereof at a rate which transforms the amplified electrical impulse into a control signal whose amplitude changes at a rate lower than that of said impulse, variable speed-driving means for operating said adjusting means, means for controlling the speed of said driving means in accordance with said control signal, and means continuously responsive to the speed of said driving means for so modifying the action of said control means as to maintain the speed of said driving means proportional to the instantaneous magnitudes of said signal whereby said adjusting means is driven through a distance which is proportional to the time integral of said electrical impulse.

11. The method of rebalancing a balanceable measuring network by movement of a balancing element through a distance which is proportioned to the time integral of an applied signal impulse whose amplitude changes at a rate greater than that at which said element may be physically adjusted which comprises storing the energy of said impulse, dissipating said stored energy at that finite rate at which said element may be physically adjusted, adjusting said element at a rate which closely follows said rate of dissipation of said energy for said movement of said element through said distance proportional to the time integral of said impulse, and thereafter storing and dissipating a further impulse for further adjustment of said element.

ALBERT J. WILLIAMS, Jr.

REFERENCES CITED

The following references are of record in the file of this patent:

UNITED STATES PATENTS

| Number | Name | Date |
| --- | --- | --- |
| Re. 21,806 | Johnson | May 20, 1941 |
| 402,674 | Judson | May 7, 1889 |
| 402,933 | Judson | May 7, 1889 |
| 2,113,164 | Williams | Apr. 5, 1938 |
| 2,150,006 | Parker et al. | Mar. 7, 1939 |
| 2,203,689 | Macdonald | June 11, 1940 |
| 2,215,678 | Weathers | Sept. 24, 1940 |
| 2,300,742 | Harrison et al. | Nov. 3, 1942 |
| 2,329,216 | Peters | Sept. 14, 1943 |
| 2,352,103 | Jones | June 20, 1944 |
| 2,355,537 | Jones | Aug. 8, 1944 |
| 2,367,746 | Williams | Jan. 23, 1945 |
| 2,382,105 | Sarver | Aug. 14, 1945 |
| 2,425,733 | Gille et al. | Aug. 19, 1947 |

Certificate of Correction

Patent No. 2,503,085 April 4, 1950

ALBERT J. WILLIAMS, Jr.

It is hereby certified that error appears in the printed specification of the above numbered patent requiring correction as follows:

Column 4, line 42, after the word "which" insert *closely*; column 9, line 10, for "reisstor" read *resistor*; column 11, line 17, for the numeral "120" read *130*; and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*